United States Patent
Blank et al.

(10) Patent No.: US 9,047,637 B1
(45) Date of Patent: Jun. 2, 2015

(54) METHOD AND SYSTEM FOR CONVERTING PRINTED CHECKS INTO PRE-PAID DEBIT CARD FUNDS

(75) Inventors: Bennett R. Blank, San Diego, CA (US); Roy Matthew Rosin, Wayne, PA (US); Christopher Womack, San Diego, CA (US); Richard Preece, San Diego, CA (US)

(73) Assignee: Intuit Inc., Mountain View, CA (US)

(*) Notice: Subject to any disclaimer, the term of this patent is extended or adjusted under 35 U.S.C. 154(b) by 66 days.

(21) Appl. No.: 13/193,401

(22) Filed: Jul. 28, 2011

(51) Int. Cl.
*G06Q 40/00* (2012.01)
*G06Q 20/42* (2012.01)
*G06Q 30/02* (2012.01)
*G06Q 20/04* (2012.01)
*G06Q 20/20* (2012.01)
*G06Q 20/10* (2012.01)

(52) U.S. Cl.
CPC ............... *G06Q 40/00* (2013.01); *G06Q 20/42* (2013.01); *G06Q 30/0237* (2013.01); *G06Q 20/04* (2013.01); *G06Q 20/20* (2013.01); *G06Q 20/10* (2013.01); *G06Q 30/0255* (2013.01)

(58) Field of Classification Search
CPC ..... G06Q 20/042; G06Q 20/10; G06Q 20/04; G06Q 20/20; G06Q 30/0237; G06Q 30/0255
USPC .......................................................... 705/35
See application file for complete search history.

(56) References Cited

U.S. PATENT DOCUMENTS

| | | | |
|---|---|---|---|
| 8,185,457 B1* | 5/2012 | Bear et al. ........................ 705/35 |
| 2003/0093367 A1* | 5/2003 | Allen-Rouman et al. ...... 705/39 |
| 2005/0086168 A1* | 4/2005 | Alvarez et al. .................. 705/41 |
| 2005/0125360 A1* | 6/2005 | Tidwell et al. .................. 705/65 |
| 2006/0271496 A1* | 11/2006 | Balasubramanian et al. .. 705/64 |
| 2009/0112761 A1* | 4/2009 | Robertson et al. .............. 705/41 |
| 2009/0292569 A1* | 11/2009 | Statland et al. .................... 705/7 |
| 2010/0224681 A1* | 9/2010 | Triplett ......................... 235/380 |
| 2010/0293079 A1 | 11/2010 | Wilson et al. |
| 2012/0203572 A1* | 8/2012 | Christensen ...................... 705/3 |
| 2013/0212008 A1* | 8/2013 | Edwards et al. ................ 705/39 |

OTHER PUBLICATIONS

Blank et al., "Method and System for Providing Rapid Access to Tax Refund Money," U.S. Appl. No. 13/193,423, filed Jul. 28, 2011.

* cited by examiner

*Primary Examiner* — William Rankins
(74) *Attorney, Agent, or Firm* — Hawley Troxell Ennis & Hawley LLP; Philip McKay

(57) ABSTRACT

A pre-paid debit or credit card account, and an associated pre-paid debit or credit card, is provided to a consumer for use with one or more check conversion stations. The check conversion stations include a card reader for obtaining user account data associated with the consumer's pre-paid debit or credit card account from the pre-paid debit or credit card and a paper check scanner for obtaining check data from a paper check provided by the consumer. At least part of the user account data and the check data is then subjected to analysis, verification, and/or approval of a transfer of at least part of the funds indicated by the check data to the balance of the pre-paid debit or credit card.

20 Claims, 2 Drawing Sheets

METHOD AND SYSTEM FOR CONVERTING PRINTED CHECKS INTO PRE-PAID DEBIT CARD FUNDS

BACKGROUND

Virtually everyone living in regions with developed economies eventually receives, and therefore needs to cash, paper or printed checks such as, but not limited to: government checks; paychecks; tax or other refund checks; rebate checks; and/or personal, i.e., party-to-party checks. However, many people do not have bank accounts and have little, or no, connection to traditional banks at all. Consequently, these non-bank affiliated consumers are typically left with very few options for converting paper checks into usable funds.

One option currently available to non-bank affiliated consumers is to cash their paper checks at various "second tier" check cashing locations such as dedicated check cashing establishments, large retail stores/outlets, pawn shops, etc. However, these second tier check cashing locations typically charge significant fees to cash checks, if they will cash them at all. As a result, the non-bank affiliated consumers, who often are in the most need of the funds, must often surrender significant portions of these needed funds in order to obtain access to what, in reality, is their money.

In addition, even in cases when a non-bank affiliated consumer is allowed to cash his or her check at a second tier check cashing location, the consumer is typically literally provided cash in exchange for the check and, while cash is very tangible medium, it is also easily stolen or lost. To make matters worse, many businesses in today's economy, such as Internet-based businesses, do not accept cash and require some form of debit or credit card payment. However, currently, many non-bank affiliated consumers have little or no way of easily converting cash into a debit or credit card balance, and even in the rare cases/systems where they can, there is again typically a significant fee required to do so, and/or significant limitations are placed on the use of the resulting debit or credit card balance, such as in-store use only.

As a result of the situation described above, currently, non-bank affiliated consumers have no simple and/or easy way convert paper check funds into debit or credit card balances. In addition, even when such a conversion is possible, using current systems, the non-bank affiliated consumers are often forced into a multi-step process, and are charged two or more significant fees by two or more parties at two or more separate locations, as they must first convert their paper check funds into cash and then convert their cash into debit or credit card balances. This situation not only represents a disservice, and significant economic burden, to the non-bank affiliated consumers, but it also inhibits the free flow of commerce.

SUMMARY

In accordance with one embodiment, a method and system for converting paper checks into pre-paid debit or credit card funds includes providing a consumer a pre-paid debit or credit card account and an associated pre-paid debit or credit card. In one embodiment, one or more check conversion stations are provided that can be accessed by the consumer, in one embodiment, in relatively public locations. In one embodiment, the check conversion stations include a card reader for obtaining user account data associated with the consumer's pre-paid debit or credit card account from the pre-paid debit or credit card and a paper check scanner for obtaining check data from a paper check provided by the consumer.

In one embodiment, the consumer provides the consumer's pre-paid debit or credit card to the check conversion station card reader of a selected check conversion station and the selected check conversion station obtains user account data associated with the consumer's pre-paid debit or credit card account. In one embodiment, the consumer also provides a paper check to the paper check scanner of the selected check conversion station and the selected check conversion station obtains check data from the paper check. In various embodiments, the check data includes, but is not limited to, a digital image the paper check and/or specific field data associated with the paper check.

In one embodiment, at least part of the user account data and the check data is provided to one or more processors associated with one or more computing systems for analysis, verification, and/or approval of the user account data and the check data, and, ultimately, verification and approval of a transfer of at least part of the funds indicated by the check data to the balance of the pre-paid debit or credit card. In one embodiment, upon analysis, verification, and/or approval of the user account data and the check data, at least a portion of the paper check funds indicated by the check data is deposited and/or added to the available balance on the pre-paid debit or credit card. In one embodiment, the user account data associated with the consumer's pre-paid debit or credit card, and the consumer's pre-paid debit or credit card account, is then updated to reflect the deposited and/or added funds and those funds are made available to the consumer through the pre-paid debit or credit card.

Using the method and system for converting paper checks into pre-paid debit or credit card funds, as discussed herein, non-bank affiliated consumers, or any other consumers, are provided a fast, simple, and easy, one step/stop process to convert paper checks into usable debit or credit card balances. Consequently, using the method and system for converting paper checks into pre-paid debit or credit card funds, as discussed herein, a significant economic burden, and considerable inconvenience, currently placed on non-bank affiliated consumers is removed, along with a significant barrier to the flow of commerce.

Figure 1:
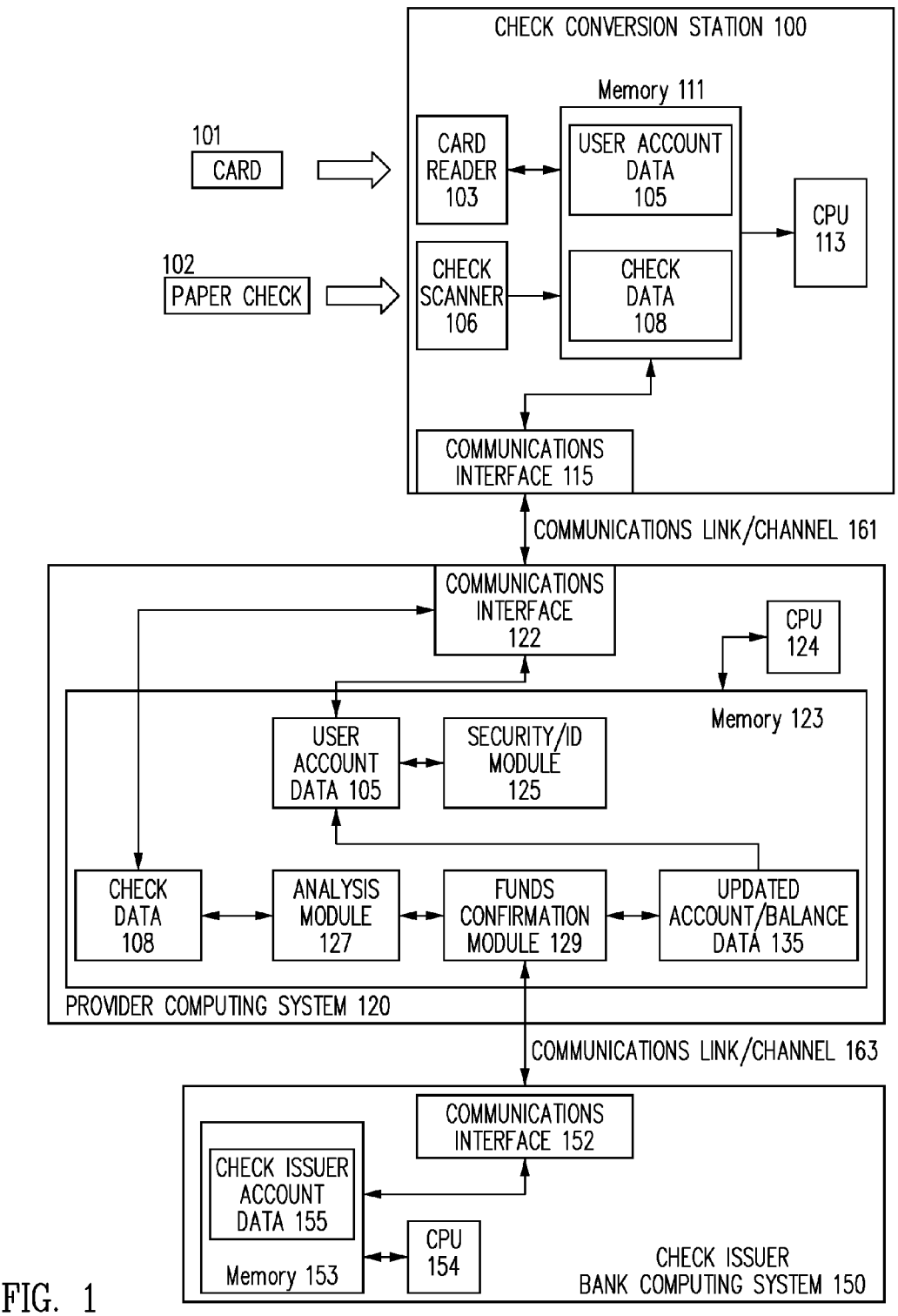
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary features. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIG.s, and/or described below.

In accordance with one embodiment, a method and system for converting paper checks into pre-paid debit or credit card funds includes providing a consumer a pre-paid debit or credit card account and an associated pre-paid debit or credit card.

In various embodiments, the consumer is provided the opportunity to sign up for the pre-paid debit or credit card account via a computing system, such as a user computing system, a provided check conversion station, as discussed below, or a public computing system. In various embodiments, the consumer is provided the opportunity to sign up for the pre-paid debit or credit card account via mail or in-person at a sign-up or check conversion station location. In various embodiments, the consumer is provided the opportunity to sign up for the pre-paid debit or credit card account via any mechanism for creating an account as discussed herein, and/or as known in the art/available at the time of filing, and or as developed/made available after the time of filing.

In various embodiments, once the consumer signs up for the pre-paid debit or credit card account, the consumer is provided a pre-paid debit or credit card that includes one or more means to provide user account data associated with the pre-paid debit or credit card account such as, but not limited to, a magnetic strip, a data/smart card chip, or any other mechanism to provide user account data as discussed herein, and/or as known in the art/available at the time of filing, and or as developed/made available after the time of filing.

Herein, the term "pre-paid debit or credit card" includes any physical or virtual mechanism for providing user account data as discussed herein, and/or as known in the art/available at the time of filing, and or as developed/made available after the time of filing, and can include, but is not limited to: physical credit or debit cards; smart cards; key chain attachments; memory sticks; data in a memory; a mobile computing system, and/or data maintained by a mobile computing system; or any one of various other means for providing user account data.

In one embodiment, one or more check conversion stations are provided that can be accessed by the consumer. In various embodiments, one or more check conversion stations are provided in relatively public locations such as grocery stores, convenience stores, gas stations, banks, or various other publically accessible locations.

In various embodiments, the check conversion stations are provided as a capability/functionality added to existing systems such as ATM machines, CoinStar™ kiosks, Redbox™ stations, and/or any other service providing stations as discussed herein, and/or as known in the art/available at the time of filing, and or as developed/made available after the time of filing.

In one embodiment, the check conversion stations include a card reader for obtaining user account data associated with the consumer's pre-paid debit or credit card account from the pre-paid debit or credit card.

In various embodiments, the check conversion station card reader can be, but is not limited to: a card swiping system; a smart card reader; a data transfer system, such as a USB port; a memory reading/access station; an infrared, or electronic, signal transmitter/receiver; a scanner; and/or any other means and/or mechanism for obtaining user account data associated with the consumer's pre-paid debit or credit card account from the pre-paid debit or credit card as discussed herein, and/or as known in the art/available at the time of filing, and or as developed/made available after the time of filing.

In one embodiment, the check conversion stations include a paper check scanner for obtaining check data from a paper check provided by the consumer. In various embodiments, the check conversion station paper check scanner can be, but is not limited to, an optical scanner and/or any means for obtaining image data, and/or any other check data, associated with a paper check as discussed herein, and/or as known in the art/available at the time of filing, and or as developed/made available after the time of filing.

In one embodiment, the consumer selects a check conversion station and provides the selected check conversion station's card reader the consumer's pre-paid debit or credit card. In one embodiment, the check conversion station then obtains user account data associated with the consumer's pre-paid debit or credit card account either from the pre-paid debit or credit card or from a database accessed via the pre-paid debit or credit card.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In various embodiments, the user account data associated with the consumer's pre-paid debit or credit card account includes, but is not limited to: the user's identification data; one or more security systems/prompts/features, such as a PIN request feature; data indicating an available balance on the pre-paid debit or credit card; and/or any other user account data desired, and/or required, by the provider of the pre-paid debit or credit card account and/or the consumer.

In one embodiment, the consumer then provides a paper check to the check conversion station's paper check scanner and the paper check is processed by the check conversion station's paper check scanner to obtain unprocessed, and/or or processed, check data.

In various embodiments, the check data includes, but is not limited to, any one or more of: a digital image of the paper check and/or specific field data associated with the paper check; the amount of the check, i.e., the funds being transferred to the consumer via the check; the payee name, i.e., the consumer's name; the payer's name, i.e., the check issuers name; the account number from which the funds are to be drawn; the bank, and/or ABA routing number, associated with the check; the date of the check; and/or any other check data desired, and/or required, by the provider of the pre-paid debit or credit card account and/or the consumer.

In one embodiment, at least part of the user account data and the check data is provided to one or more processors associated with one or more computing systems for analysis, verification, and/or approval of the user account data and the check data, and, ultimately, verification and approval of a transfer of at least part of the funds indicated by the check data to the balance of the pre-paid debit or credit card.

In one embodiment, at least part of the user account data and the check data is provided to one or more processors associated with the check conversion station, i.e., processors that are at the same location as, or are part of, the check conversion station.

In one embodiment, at least part of the user account data and the check data is provided to one or more processors associated with one or more computing systems, such as a provider computing system, that are in a separate location from the check conversion station and at least part of the user account data and the check data is provided by the check conversion station to one or more processors associated with one or more remote computing systems via a communications link/channel. In various embodiments, the communications link/channel can be, but is not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

In various embodiments, at least part of the user account data and the check data is analyzed to verify the consumer's identity.

In various embodiments, at least part of the user account data and the check data is analyzed to determine the consumer's, and/or the payer's, historical transaction activity and/or assess the consumer's, and/or the payer's, reliability. In various embodiments, depending on the amount of funds involved, and the consumer's, and/or the payer's, historical transaction activity, a transfer of the funds indicated by the check data to the balance of the pre-paid debit or credit card is approved without further analysis/verification. In various embodiments, depending on the amount of funds involved, and the consumer's, and/or the payer's, historical transaction activity, a transfer of only a portion of the funds indicated by the check data to the balance of the pre-paid debit or credit card is approved without further analysis/verification.

In various embodiments, at least part of the user account data and the check data is analyzed to verify the that the funds to be transferred via the paper check are available in the issuing party's account prior to approving a transfer of any of the funds indicated by the check data to the balance of the pre-paid debit or credit card. In these embodiments, the check data is analyzed to determine the payer's, i.e., the issuing party's, bank, and the bank account associated with the paper check. In one embodiment, the payer's bank, or a computing system associated with the payer's bank, is then contacted and the availability of at least part of the funds is verified. In one embodiment, the payer's bank is contacted, and the availability of at least part of the funds is verified, via one or more communications links/channels.

In one embodiment, upon analysis, verification, and/or approval of the user account data and the check data, at least a portion of the paper check funds indicated by the check data is virtually deposited and/or added to the available balance on the pre-paid debit or credit card. In one embodiment, the at least a portion of the paper check funds indicated by the check data is virtually deposited and/or added to the available balance on the pre-paid debit or credit card via the check conversion station.

In one embodiment, the user account data associated with the consumer's pre-paid debit or credit card, and the consumer's pre-paid debit or credit card account, is then updated to reflect the virtually deposited and/or added funds and those funds are made available to the consumer through the pre-paid debit or credit card in relative real time.

In one embodiment, the user account data associated with the consumer's pre-paid debit or credit card, and the consumer's pre-paid debit or credit card account, is then updated to reflect the virtually deposited and/or added funds and those funds are made available to the consumer through the pre-paid debit or credit card via the check conversion station.

In one embodiment, at the time the funds are made available to the consumer through the pre-paid debit or credit card, the consumer is also provided one or more Card Linked Offers (CLOs) whereby special bonuses, offers, and/or balance additions/multipliers are provided if the consumer uses the pre-paid debit or credit card balance in qualifying ways.

For instance, as one illustrative example, in one embodiment, at the time the funds are made available to the consumer through the pre-paid debit or credit card, the consumer is informed that if the consumer uses the pre-paid debit or credit card to make specific purchases, or purchases with a defined merchant, the balance on pre-paid debit or credit card will be increased by 10%.

In some cases, the CLOs will require tracking the consumer's purchases. In various embodiments, this task can be accomplished using the user account data associated with the pre-paid debit or credit card account, and/or stored on the pre-paid debit or credit card. In various embodiments, tracking the consumer's purchases can be accomplished using various merchant point-of-sale systems, or using any mechanism for tracking consumer purchases as discussed herein, known at the time of filing, or as developed thereafter.

Using the method and system for converting paper checks into pre-paid debit or credit card funds, as discussed herein, non-bank affiliated consumers, or any other consumers, are provided a fast, simple, and easy, one step/stop process to convert paper checks into usable debit or credit card balances. Consequently, using the method and system for converting paper checks into pre-paid debit or credit card funds, as discussed herein, a significant economic burden, and considerable inconvenience, currently placed on non-bank affiliated consumers is removed, along with a significant barrier to the flow of commerce.

Hardware Architecture

FIG. 1 is a block diagram of an exemplary hardware architecture for implementing one embodiment of a system and method for converting paper checks into pre-paid debit or credit card funds, such as exemplary process 200 (FIG. 2) discussed herein, that, returning to FIG. 1, includes: a check conversion station 100, e.g., a first computing system; a provider computing system 120, e.g., a second computing system; and a check issuer bank computing system 150, e.g., a third computing system, all operatively coupled by various communications links 161 and 163.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In addition, herein, the term "portable computing system" and "mobile computing system" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, check conversion station 100 typically includes: a card reader 103; a check scanner 106; a central processing unit (CPU) 113; a communications interface 115; and a memory 111.

In one embodiment, one or more check conversion stations 100 are provided that can be accessed by the consumer. In various embodiments, one or more check conversion stations 100 are provided in relatively public locations such as grocery stores, convenience stores, gas stations, banks, or various other publically accessible locations.

In various embodiments, check conversion stations 100 are provided as a capability/functionality added to existing systems such as ATM machines, CoinStar™ kiosks, Redbox™ stations, and/or any other service providing stations as discussed herein, and/or as known in the art/available at the time of filing, and or as developed/made available after the time of filing.

In one embodiment, card reader 103 is used to obtain user account data 105 associated with a consumer's pre-paid debit or credit card account from the pre-paid debit or credit card, such as card 101.

In one embodiment card 101 includes one or more means to provide user account data associated with the pre-paid debit or credit card account such as, but not limited to, a magnetic strip, a data/smart card chip, or any other mechanism to provide user account data as discussed herein, and/or as known in the art/available at the time of filing, and or as developed/made available after the time of filing.

Herein, the term "pre-paid debit or credit card" and "card" includes any physical or virtual mechanism for providing user account data as discussed herein, and/or as known in the art/available at the time of filing, and or as developed/made available after the time of filing, and can include, but is not limited to: physical credit or debit cards; key chain attachments; memory sticks; data in a memory; a smart card; a mobile computing system, and/or data maintained by a mobile computing system; or any one of various other means for providing user account data.

In various embodiments, card reader 103 can be, but is not limited to: a card swiping system; a data transfer system, such as a USB port; a memory reading/access station; an infrared, or electronic, signal receiver; a scanner; and/or any other means and/or mechanism for obtaining user account data associated with the consumer's pre-paid debit or credit card account from the pre-paid debit or credit card as discussed herein, and/or as known in the art/available at the time of filing, and or as developed/made available after the time of filing.

In one embodiment, check conversion station 100 includes check scanner 106. In various embodiments, check scanner 106 is a paper check scanner for obtaining check data 108 from a paper check 102 provided by the consumer. In various embodiments, check scanner 106 can be, but is not limited to, an optical scanner and/or any means for obtaining image data, and/or any other check data, associated with a paper check as discussed herein, and/or as known in the art/available at the time of filing, and or as developed/made available after the time of filing.

In one embodiment, memory 111 includes all, or part, of user account data 105 and check data 108.

In various embodiments, user account data 105 includes, but is not limited to: the user's identification data; one or more security systems/prompts/features, such as a PIN request feature; data indicating an available balance on the pre-paid debit or credit card; and/or any other user account data desired, and/or required, by the provider of the pre-paid debit or credit card account and/or the consumer.

In various embodiments, check data 108 includes, but is not limited to, any one or more of: a digital image of the paper check and/or specific field data associated with the paper check; the amount of the check, i.e., the funds being transferred to the consumer via the check; the payee name, i.e., the consumer's name; the payer's name, i.e., the check issuers name; the account number from which the funds are to be drawn; the bank, and/or ABA routing number, associated with the check; the date of the check; and/or any other check data desired, and/or required, by the provider of the pre-paid debit or credit card account and/or the consumer.

In one embodiment, the consumer selects check conversion station 100 and provides check conversion station's card reader 103 the consumer's pre-paid debit or credit card 101. In one embodiment, check conversion station 100 then obtains user account data 105 associated with the consumer's pre-paid debit or credit card account either from the pre-paid debit or credit card 101 or from a database, such as provider computing system 120, accessed via pre-paid debit or credit card 101.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, the consumer then provides paper check 102 to the check conversion station's paper check scanner 106 and paper check 102 is processed by the check conversion station's paper check scanner 106 to obtain unprocessed, and/or or processed, check data 108.

In one embodiment, at least part of user account data 105 and check data 108 is provided to one or more processors, such as CPU 113 and/or CPU 124, associated with one or more computing systems, such as check conversion system 100 or provider computing system 120, for analysis, verification, and/or approval of user account data 105 and check data 108, and ultimately verification and approval of a virtual transfer of at least part of the funds indicated by check data 108 to the balance of pre-paid debit or credit card 101.

In one embodiment, at least part of user account data 105 and check data 108 is provided to one or more processors, such as CPU 113, associated with check conversion station 100, i.e., that are at the same location as check conversion station 100.

In one embodiment, at least part of user account data 105 and check data 108 is provided to one or more processors, such as CPU 124, associated with one or more computing systems, such as provider computing system 120, that are in a separate location from check conversion station 100 and at least part of user account data 105 and check data 108 is provided by check conversion station 100, through communication interface 115, to one or more processors, such as CPU 124, associated with one or more remote computing systems, such as provider computing system 120, via a communications link/channel 161, and communication interface 122.

In various embodiments, communications link/channel 161, and/or 163 discussed below, can be, but are not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

Check conversion station 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, check conversion station 100, whether available or known at the time of filing or as later developed.

In various embodiments, check conversion station 100 is be any computing system as defined herein and/or as known in the art at the time of filing, and/or as developed thereafter, that includes components that can execute all, or part, of process for converting paper checks into pre-paid debit or credit card funds 200 in accordance with at least one of the embodiments as described herein.

As seen in FIG. 1, provider computing system 120 typically includes a central processing unit (CPU) 124; a communications interface 122; and a memory 123.

In various embodiments, provider computing system 120 is a server computing system used to provide analysis, verification, and/or approval of user account data 105 and check data 108, and ultimately verification and approval of a virtual transfer of at least part of the funds indicated by check data 108 to the balance of pre-paid debit or credit card 101.

In one embodiment, memory 123 includes all, or part, of user account data 105 and check data 108 received from check conversion station 100.

In one embodiment, user account data 105 is processed by security/ID module 125 to verify the identity of the consumer.

In one embodiment, check data 108 is processed by analysis module 127 to parse and obtain the desired information from check data 108 such as, but not limited to: specific field data associated with paper check 102; the amount of check 102, i.e., the funds being transferred to the consumer via check 102; the payee name, i.e., the consumer's name; the payer's name, i.e., the check issuers name; the account number from which the funds are to be drawn; the bank, and/or ABA routing number, associated with check 102; the date of check 102; and/or any other check data 108 desired, and/or required, by the provider of the pre-paid debit or credit card account and/or the consumer.

In various embodiments, at least part of user account data 105 and check data 108 is analyzed to determine the consumer's, and/or the payer's, historical transaction activity and/or assess the consumer's, and/or the payer's, reliability. In various embodiments, depending on the amount of funds involved, and the consumer's, and/or the payer's, historical transaction activity, a virtual transfer of the funds indicated by check data 108 to the balance of the pre-paid debit or credit card 101 is approved without further analysis/verification. In various embodiments, depending on the amount of funds involved, and the consumer's, and/or the payer's, historical transaction activity, a virtual transfer of only a portion of the funds indicated by check data 108 to the balance of the pre-paid debit or credit card 101 is approved without further analysis/verification In various embodiments, at least part of user account data 105 and check data 108 is analyzed to verify the that the funds to be transferred via paper check 102 are available in the issuing parties, i.e., payer's, account prior to approving a virtual transfer of any of the funds indicated by check data 108 to the balance of the pre-paid debit or credit card 101. In these embodiments, check data 108 is analyzed by funds confirmation module 129 to determine the payer's, i.e., the issuing party's, bank and the bank account associated with the paper check.

In one embodiment, the payer's bank, or a computing system associated with the payer's bank, such as check issuer bank computing system 150, is contacted and the availability of at least part of the funds is verified by CPU 153 and checking check issuer account data 155 in memory 153 of check issuer bank computing system 150. In one embodiment, the payer's bank is contacted, and the availability of at least part of the funds is verified, via one or more communications links/channels, such as communication link/channel 163.

In one embodiment, upon analysis, verification, and/or approval of user account data 105 and check data 108, at least a portion of the paper check 102 funds indicated by check data 108 is approved for virtual transfer and is virtually deposited and/or added to the available balance on the pre-paid debit or credit card 101.

In one embodiment, the at least a portion of the paper check funds indicated by check data 108 is virtually deposited and/or added to the available balance on the pre-paid debit or credit card 101 via check conversion station 100.

In one embodiment, user account data 105 associated with the consumer's pre-paid debit or credit card 101, and the consumer's pre-paid debit or credit card account, is then updated by updated account/balance data 135 to reflect the virtually deposited and/or added funds and those funds are made available to the consumer through pre-paid debit or credit card 101.

In one embodiment, check conversion station 100, provider computing systems 120, and check issuer bank computing system 150, are part of a cloud computing environment.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of check conversion station 100, provider computing systems 120, and check issuer bank computing system 150 may be located remotely from their respective system and accessed via communication channels 161 and/or 163.

As discussed in more detail below, in one embodiment, data associated with process for converting paper checks into pre-paid debit or credit card funds, and/or data associated with one or more users/consumers, is stored, in whole, or in part, in one or more memory systems, and/or cache memories, associated with one or more computing systems. As used herein, a memory refers to a volatile memory, a non-volatile memory, or any combination of the two.

Although process for converting paper checks into pre-paid debit or credit card funds is sometimes referred to herein, alternatively, as a process, an application, a module, a program, a component of a software system, a component of a software package, a component of a parent system, a plug-in, or a feature of a parent system, this terminology is illustrative only. In some embodiments, a process for converting paper checks into pre-paid debit or credit card funds is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 113, 124, and 154. In one embodiment, execution of a process by CPU 113, 124, or 154 results in the operations of an agent computer process (not shown) and/or a rule computer process (not shown).

In one embodiment, a process for converting paper checks into pre-paid debit or credit card funds is a computer application or process and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

In accordance with one embodiment, a method and system for converting paper checks into pre-paid debit or credit card funds includes providing a consumer a pre-paid debit or credit card account and an associated pre-paid debit or credit card. In one embodiment, one or more check conversion stations are provided that can be accessed by the consumer, in one embodiment, in relatively public locations. In one embodiment, the check conversion stations include a card reader for obtaining user account data associated with the consumer's pre-paid debit or credit card account from the pre-paid debit or credit card and a paper check scanner for obtaining check data from a paper check provided by the consumer.

In one embodiment, the consumer provides the consumer's pre-paid debit or credit card to the check conversion station card reader of a selected check conversion station and the selected check conversion station obtains user account data associated with the consumer's pre-paid debit or credit card account. In one embodiment, the consumer also provides a paper check to the paper check scanner of the selected check conversion station and the selected check conversion station obtains check data from the paper check. In various embodiments, the check data includes, but is not limited to, a digital image the paper check and/or specific field data associated with the paper check.

In one embodiment, at least part of the user account data and the check data is provided to one or more processors associated with one or more computing systems for analysis, verification, and/or approval of the user account data and the check data, and, ultimately, verification and approval of a transfer of at least part of the funds indicated by the check data to the balance of the pre-paid debit or credit card. In one embodiment, upon analysis, verification, and/or approval of the user account data and the check data, at least a portion of the paper check funds indicated by the check data is deposited and/or added to the available balance on the pre-paid debit or credit card. In one embodiment, the user account data associated with the consumer's pre-paid debit or credit card, and the consumer's pre-paid debit or credit card account, is then updated to reflect the deposited and/or added funds and those funds are made available to the consumer through the pre-paid debit or credit card relatively quickly.

Figure 2:
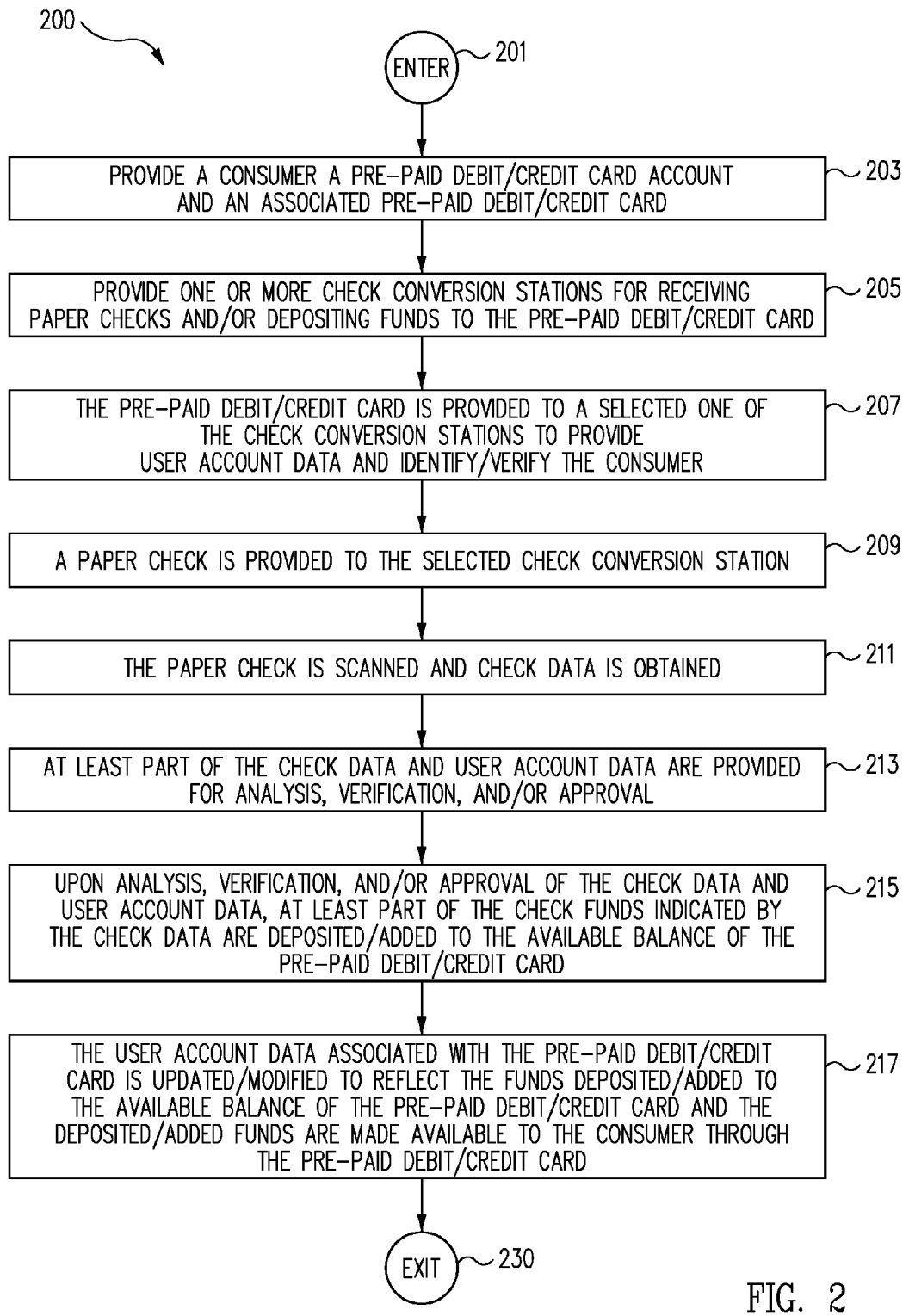
FIG. 2 is a flow chart depicting one embodiment of a process for converting paper checks into pre-paid debit or credit card funds in accordance with one embodiment.

FIG. 2 is a flow chart depicting a process for converting paper checks into pre-paid debit or credit card funds 200 in accordance with one embodiment. Process for converting paper checks into pre-paid debit or credit card funds 200 begins at ENTER OPERATION 201 of FIG. 2 and process flow proceeds to PROVIDE A CONSUMER A PRE-PAID DEBIT/CREDIT CARD ACCOUNT AND AN ASSOCIATED PRE-PAID DEBIT/CREDIT CARD OPERATION 203.

In one embodiment, at PROVIDE A CONSUMER A PRE-PAID DEBIT/CREDIT CARD ACCOUNT AND AN ASSOCIATED PRE-PAID DEBIT/CREDIT CARD OPERATION 203 a consumer is provided a pre-paid debit or credit card account and an associated pre-paid debit or credit card.

In various embodiments, at PROVIDE A CONSUMER A PRE-PAID DEBIT/CREDIT CARD ACCOUNT AND AN ASSOCIATED PRE-PAID DEBIT/CREDIT CARD OPERATION 203 the consumer is provided the opportunity to sign up for the pre-paid debit or credit card account via a computing system, such as a user computing system, and/or a provided check conversion station, as discussed below, and/or a public computing system, and one or more user interface devices such as a keyboard, a mouse, a touchpad, voice recognition software, or any other mechanism or device for converting user actions into processor instructions and/or computer commands/actions.

In various embodiments, at PROVIDE A CONSUMER A PRE-PAID DEBIT/CREDIT CARD ACCOUNT AND AN ASSOCIATED PRE-PAID DEBIT/CREDIT CARD OPERATION 203 the consumer is provided the opportunity to sign up for the pre-paid debit or credit card account via mail, or in-person at a sign-up or check conversion station location. In various embodiments, the consumer is provided the opportunity to sign up for the pre-paid debit or credit card account via any mechanism for creating an account as discussed herein, and/or as known in the art/available at the time of filing, and or as developed/made available after the time of filing.

In various embodiments, at PROVIDE A CONSUMER A PRE-PAID DEBIT/CREDIT CARD ACCOUNT AND AN ASSOCIATED PRE-PAID DEBIT/CREDIT CARD OPERATION 203 once the consumer signs up for the pre-paid debit or credit card account, the consumer is provided a pre-paid debit or credit card that includes one or more means to provide user account data associated with the pre-paid debit or credit card account such as, but not limited to, a magnetic strip, a data/smart card chip, or any other mechanism to provide user account data as discussed herein, and/or as known in the art/available at the time of filing, and or as developed/made available after the time of filing.

Herein, the term "pre-paid debit or credit card" includes any physical or virtual mechanism for providing user account data as discussed herein, and/or as known in the art/available at the time of filing, and or as developed/made available after the time of filing, and can include, but is not limited to: physical credit or debit cards; smart cards; key chain attachments; memory sticks; data in a memory; a mobile computing system, and/or data maintained by a mobile computing system; or any one of various other means for providing user account data.

In one embodiment, once a consumer is provided a pre-paid debit or credit card account and an associated pre-paid debit or credit card at PROVIDE A CONSUMER A PRE-PAID DEBIT/CREDIT CARD ACCOUNT AND AN ASSOCIATED PRE-PAID DEBIT/CREDIT CARD OPERATION 203, process flow proceeds to PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205.

In one embodiment, at PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 one or more check conversion stations are provided that can be accessed by the consumer.

In various embodiments, at PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 one or more check conversion stations are provided in relatively public locations such as grocery stores, convenience stores, gas stations, banks, or various other publically accessible locations.

In various embodiments, at PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 the check conversion stations are provided as a capability/functionality added to existing systems such as ATM machines, CoinStar™ kiosks, Redbox™ stations, and/or any other service providing stations and/or kiosks, as discussed herein, and/or as known in the art/available at the time of filing, and or as developed/made available after the time of filing.

In one embodiment, the check conversion stations of PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 include a card reader for obtaining user account data associated with the consumer's pre-paid debit or credit card account from the pre-paid debit or credit card.

In various embodiments, the check conversion station card reader can be, but is not limited to: a card swiping system; a smart card reader; a data transfer system, such as a USB port; a memory reading/access station; an infrared, or electronic, signal transmitter/receiver; a scanner; and/or any other means and/or mechanism for obtaining user account data associated with the consumer's pre-paid debit or credit card account from the pre-paid debit or credit card as discussed herein, and/or as known in the art/available at the time of filing, and or as developed/made available after the time of filing.

In one embodiment, the check conversion stations of PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 include a paper check scanner for obtaining check data from a paper check provided by the consumer.

In various embodiments, the check conversion station paper check scanner can be, but is not limited to, an optical scanner and/or any means for obtaining image data, and/or any other check data, associated with a paper check as discussed herein, and/or as known in the art/available at the time of filing, and or as developed/made available after the time of filing.

In one embodiment, once one or more check conversion stations are provided that can be accessed by the consumer at PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205, process flow proceeds to THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207.

In one embodiment, at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207 the consumer provides the consumer's pre-paid debit or credit card of PROVIDE A CONSUMER A PRE-PAID DEBIT/CREDIT CARD ACCOUNT AND AN ASSOCIATED PRE-PAID DEBIT/CREDIT CARD OPERATION 203 to the check conversion station card reader of a selected check conversion station of PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205 and the selected check conversion station obtains user account data associated with the consumer's pre-paid debit or credit card account.

In one embodiment, at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207 once the consumer selects a check conversion station and provides the selected check conversion station's card reader the consumer's pre-paid debit or credit card, the check conversion station obtains user account data associated with the consumer's pre-paid debit or credit card account either from the pre-paid debit or credit card or from a database accessed via the pre-paid debit or credit card.

In various embodiments, the user account data associated with the consumer's pre-paid debit or credit card account includes, but is not limited to: the user's identification data; one or more security systems/prompts/features, such as a PIN request feature; data indicating an available balance on the pre-paid debit or credit card; and/or any other user account data desired, and/or required, by the provider of the pre-paid debit or credit card account and/or the consumer.

In one embodiment, once the consumer provides the consumer's pre-paid debit or credit card of PROVIDE A CONSUMER A PRE-PAID DEBIT/CREDIT CARD ACCOUNT AND AN ASSOCIATED PRE-PAID DEBIT/CREDIT CARD OPERATION 203 to the check conversion station card reader of a selected check conversion station of PROVIDE ONE OR MORE CHECK CONVERSION STATIONS FOR RECEIVING PAPER CHECKS AND/OR DEPOSITING FUNDS TO THE PRE-PAID DEBIT/CREDIT CARD OPERATION 205, and the selected check conversion station obtains user account data associated with the consumer's pre-paid debit or credit card account, at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207, process flow proceeds to A PAPER CHECK IS PROVIDED TO THE SELECTED CHECK CONVERSION STATION OPERATION 209.

In one embodiment, at A PAPER CHECK IS PROVIDED TO THE SELECTED CHECK CONVERSION STATION OPERATION 209 the consumer provides a paper check to the paper check scanner of the selected check conversion station of PROVIDE A CONSUMER A PRE-PAID DEBIT/CREDIT CARD ACCOUNT AND AN ASSOCIATED PRE-PAID DEBIT/CREDIT CARD OPERATION 203.

In one embodiment, once the consumer provides the paper check to the paper check scanner of the selected check conversion station of PROVIDE A CONSUMER A PRE-PAID DEBIT/CREDIT CARD ACCOUNT AND AN ASSOCIATED PRE-PAID DEBIT/CREDIT CARD OPERATION 203 at A PAPER CHECK IS PROVIDED TO THE SELECTED CHECK CONVERSION STATION OPERATION 209, process flow proceeds to THE PAPER CHECK IS SCANNED AND CHECK DATA IS OBTAINED OPERATION 211.

In one embodiment, at THE PAPER CHECK IS SCANNED AND CHECK DATA IS OBTAINED OPERATION 211 the paper check provided to the check conversion station's paper check scanner of A PAPER CHECK IS PROVIDED TO THE SELECTED CHECK CONVERSION STATION OPERATION 209 is processed by the check conversion station's paper check scanner to obtain unprocessed, and/or or processed, check data.

In various embodiments, the check data includes, but is not limited to, any one or more of: a digital image of the paper check and/or specific field data associated with the paper check; the amount of the check, i.e., the funds being transferred to the consumer via the check; the payee name, i.e., the consumer's name; the payer's name, i.e., the check issuers name; the account number from which the funds are to be drawn; the bank, and/or ABA routing number, associated with the check; the date of the check; and/or any other check data desired, and/or required, by the provider of the pre-paid debit or credit card account and/or the consumer.

In one embodiment, once the paper check provided to the check conversion station's paper check scanner of A PAPER CHECK IS PROVIDED TO THE SELECTED CHECK CONVERSION STATION OPERATION 209 is processed by the check conversion station's paper check scanner to obtain unprocessed, and/or or processed, check data at THE PAPER CHECK IS SCANNED AND CHECK DATA IS OBTAINED OPERATION 211, process flow proceeds to AT LEAST PART OF THE CHECK DATA AND USER ACCOUNT DATA ARE PROVIDED FOR ANALYSIS, VERIFICATION, AND/OR APPROVAL OPERATION 213.

In one embodiment, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data obtained at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207 and the check data obtained at THE PAPER CHECK IS SCANNED AND CHECK DATA IS OBTAINED OPERATION 211 is provided to one or more processors associated with one or more computing systems for analysis, verification, and/or approval of the user account data and the check data.

In one embodiment, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data obtained at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207 and the check data obtained at THE PAPER CHECK IS SCANNED AND CHECK DATA IS OBTAINED OPERATION 211 is provided to one or more processors associated with one or more computing systems for analysis, verification, and/or approval of the user account data and the check data, and, ultimately, verification and approval of a transfer of at least part of the funds indicated by the check data to the balance of the pre-paid debit or credit card.

In one embodiment, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data and the check data is provided to one or more processors associated with the check conversion station of THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207, i.e., processors that are at the same location as, or are part of, the check conversion station.

In one embodiment, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data and the check data is provided to one or more processors, such as CPU 124 of FIG. 1, associated with one or more computing systems, such as provider computing system 120 of FIG. 1, that are in a separate/remote location from the check conversion station and at least part of the user account data and the check data is provided by the check conversion station to one or more processors associated with one or more remote computing systems via a communications link/channel.

In various embodiments, the communications link/channel can be, but is not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

Returning to FIG. 2, in one embodiment, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data and the check data is analyzed to verify the consumer's identity.

In various embodiments, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data and the check data is analyzed to determine the consumer's, and/or the payer's, historical transaction activity and/or assess the consumer's, and/or the payer's, reliability.

In various embodiments, at AT LEAST PART OF THE CHECK DATA AND USER ACCOUNT DATA ARE PROVIDED FOR ANALYSIS, VERIFICATION, AND/OR APPROVAL OPERATION 213 depending on the amount of funds involved, and the consumer's, and/or the payer's, historical transaction activity, a transfer of the funds indicated by the check data to the balance of the pre-paid debit or credit card is approved without further analysis/verification.

In various embodiments, at AT LEAST PART OF THE CHECK DATA AND USER ACCOUNT DATA ARE PROVIDED FOR ANALYSIS, VERIFICATION, AND/OR APPROVAL OPERATION 213 depending on the amount of funds involved, and the consumer's, and/or the payer's, historical transaction activity, a transfer of only a portion of the funds indicated by the check data to the balance of the pre-paid debit or credit card is approved without further analysis/verification.

In various embodiments, at AT LEAST PART OF THE CHECK DATA AND USER ACCOUNT DATA ARE PROVIDED FOR ANALYSIS, VERIFICATION, AND/OR APPROVAL OPERATION 213 at least part of the user account data and the check data is analyzed to verify the that the funds to be transferred via the paper check are available in the issuing party's account prior to approving a transfer of any of the funds indicated by the check data to the balance of the pre-paid debit or credit card. In these embodiments, the check data is analyzed to determine the payer's, i.e., the issuing party's, bank, and the bank account associated with the paper check. In one embodiment, the payer's bank, or a computing system associated with the payer's bank, is then contacted and the availability of at least part of the funds is verified. In one embodiment, the payer's bank is contacted, and the availability of at least part of the funds is verified, via one or more communications links/channels.

In one embodiment, once at least part of the user account data obtained at THE PRE-PAID DEBIT/CREDIT CARD IS PROVIDED TO A SELECTED ONE OF THE CHECK CONVERSION STATIONS TO PROVIDE USER ACCOUNT DATA AND IDENTIFY/VERIFY THE CONSUMER OPERATION 207 and the check data obtained at THE PAPER CHECK IS SCANNED AND CHECK DATA IS OBTAINED OPERATION 211 is provided to one or more processors associated with one or more computing systems for analysis, verification, and/or approval of the user account data and the check data at AT LEAST PART OF THE CHECK DATA AND USER ACCOUNT DATA ARE PROVIDED FOR ANALYSIS, VERIFICATION, AND/OR APPROVAL OPERATION 213, process flow proceeds to UPON ANALYSIS, VERIFICATION, AND/OR APPROVAL OF THE CHECK DATA AND USER ACCOUNT DATA, AT LEAST PART OF THE CHECK FUNDS INDICATED BY THE CHECK DATA ARE DEPOSITED/ADDED TO THE AVAILABLE BALANCE OF THE PRE-PAID DEBIT/CREDIT CARD OPERATION 215.

In one embodiment, at UPON ANALYSIS, VERIFICATION, AND/OR APPROVAL OF THE CHECK DATA AND USER ACCOUNT DATA, AT LEAST PART OF THE CHECK FUNDS INDICATED BY THE CHECK DATA ARE DEPOSITED/ADDED TO THE AVAILABLE BALANCE OF THE PRE-PAID DEBIT/CREDIT CARD OPERATION 215 upon analysis, verification, and/or approval of the user account data and the check data at AT LEAST PART OF THE CHECK DATA AND USER ACCOUNT DATA ARE PROVIDED FOR ANALYSIS, VERIFICATION, AND/OR APPROVAL OPERATION 213, at least a portion of the paper check funds indicated by the check data is deposited and/or added to the available balance on the pre-paid debit or credit card.

In one embodiment, at UPON ANALYSIS, VERIFICATION, AND/OR APPROVAL OF THE CHECK DATA AND USER ACCOUNT DATA, AT LEAST PART OF THE CHECK FUNDS INDICATED BY THE CHECK DATA ARE DEPOSITED/ADDED TO THE AVAILABLE BALANCE OF THE PRE-PAID DEBIT/CREDIT CARD OPERATION 215 upon analysis, verification, and/or approval of the user account data and the check data at AT LEAST PART OF THE CHECK DATA AND USER ACCOUNT DATA ARE PROVIDED FOR ANALYSIS, VERIFICATION, AND/OR APPROVAL OPERATION 213, at least a portion of the paper check funds indicated by the check data is virtually deposited and/or added to the available balance on the pre-paid debit or credit card.

In various embodiments, at UPON ANALYSIS, VERIFICATION, AND/OR APPROVAL OF THE CHECK DATA AND USER ACCOUNT DATA, AT LEAST PART OF THE CHECK FUNDS INDICATED BY THE CHECK DATA ARE DEPOSITED/ADDED TO THE AVAILABLE BALANCE OF THE PRE-PAID DEBIT/CREDIT CARD OPERATION 215 at least a portion of the paper check funds indicated by the check data is virtually deposited and/or added to the available balance on the pre-paid debit or credit card. In one embodiment, the at least a portion of the paper check funds indicated by the check data is virtually deposited and/or added to the available balance on the pre-paid debit or credit card via the check conversion station.

In one embodiment, once at least a portion of the paper check funds indicated by the check data is deposited and/or added to the available balance on the pre-paid debit or credit card at UPON ANALYSIS, VERIFICATION, AND/OR APPROVAL OF THE CHECK DATA AND USER ACCOUNT DATA, AT LEAST PART OF THE CHECK FUNDS INDICATED BY THE CHECK DATA ARE DEPOSITED/ADDED TO THE AVAILABLE BALANCE OF THE PRE-PAID DEBIT/CREDIT CARD OPERATION 215, process flow proceeds to THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217.

In one embodiment, at THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217 the user account data associated with the consumer's pre-paid debit or credit card, and the consumer's pre-paid debit or credit card account, of PROVIDE A CONSUMER A PRE-PAID DEBIT/CREDIT CARD ACCOUNT AND AN ASSOCIATED PRE-PAID DEBIT/CREDIT CARD OPERATION 203 is updated to reflect the deposited and/or added funds and those funds are made available to the consumer through the pre-paid debit or credit card.

In one embodiment, at THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217 the user account data associated with the consumer's pre-paid debit or credit card, and the consumer's pre-paid debit or credit card account, is updated to reflect the deposited and/or added funds and those funds are made available to the consumer through the pre-paid debit or credit card in relative real time.

In one embodiment, at THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217 the user account data associated with the consumer's pre-paid debit or credit card, and the consumer's pre-paid debit or credit card account, is updated to reflect the deposited and/or added funds and those funds are made available to the consumer through the pre-paid debit or credit card via the check conversion station.

In one embodiment, at the time the funds are made available to the consumer through the pre-paid debit or credit card at THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217, the consumer is also provided one or more Card Linked Offers (CLOs) whereby special bonuses, offers, and/or balance additions/multipliers are provided if the consumer uses the pre-paid debit or credit card balance in qualifying ways.

For instance, as one illustrative example, in one embodiment, at the time the funds are made available to the consumer through the pre-paid debit or credit card the consumer is informed that if the consumer uses the pre-paid debit or credit card to make specific purchases, or purchases with a defined merchant, the balance on pre-paid debit or credit card will be increased by 10%.

In some cases, the CLOs will require tracking the consumer's purchases. In various embodiments, this task can be accomplished using the user account data associated with the pre-paid debit or credit card account and/or stored on the pre-paid debit or credit card. In various embodiments, tracking the consumer's purchases can be accomplished using various merchant point-of-sale systems, and/or using any mechanism for tracking consumer purchases as discussed herein, known at the time of filing, or as developed thereafter.

In one embodiment, once the user account data associated with the consumer's pre-paid debit or credit card, and the consumer's pre-paid debit or credit card account, of PROVIDE A CONSUMER A PRE-PAID DEBIT/CREDIT CARD ACCOUNT AND AN ASSOCIATED PRE-PAID DEBIT/CREDIT CARD OPERATION 203 is updated to reflect the deposited and/or added funds and those funds are made available to the consumer through the pre-paid debit or credit card while the consumer waits at THE USER ACCOUNT DATA ASSOCIATED WITH THE PRE-PAID DEBIT/CREDIT CARD IS UPDATED/MODIFIED TO REFLECT THE FUNDS DEPOSITED/ADDED TO THE AVAILABLE BALANCE OF THE PRE-PAID DEBIT/CREDIT CARD AND THE DEPOSITED/ADDED FUNDS ARE MADE AVAILABLE TO THE CONSUMER THROUGH THE PRE-PAID DEBIT/CREDIT CARD OPERATION 217, process flow proceeds to EXIT OPERATION 230. In one embodiment, at EXIT OPERATION 230 process for converting paper checks into pre-paid debit or credit card funds 200 is exited to await new data and/or a newly detected trigger event.

Using process for converting paper checks into pre-paid debit or credit card funds 200, non-bank affiliated consumers, or any other consumers, are provided a fast, simple, and easy, one step/stop process to convert paper checks into usable debit or credit card balances. Consequently, using process for converting paper checks into pre-paid debit or credit card funds 200, a significant economic burden, and considerable inconvenience, currently placed on non-bank affiliated consumers is removed, along with a significant barrier to the flow of commerce.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for converting paper checks into pre-paid debit or credit card funds comprising the following, which when executed individually or collectively by any set of one or more processors perform a process comprising:

providing a consumer a pre-paid debit or credit card account;

providing a consumer a pre-paid debit or credit card associated with the pre-paid debit or credit card account, the pre-paid debit or credit card having an associated pre-paid debit or credit card balance stored on the pre-paid debit or credit card, the pre-paid debit or credit card balance representing funds that can be used via the pre-paid debit or credit card;

providing a check conversion station, the check conversion station including a card reader and a paper check scanning capability;

the consumer providing the pre-paid debit or credit card to the check conversion station card reader and the check conversion station obtaining consumer account data from the pre-paid debit or credit card;

the consumer providing a paper check to the check conversion station paper check scanning capability, the paper check representing paper check funds transferred from a payer listed on the paper check to the consumer via the paper check;

the check conversion station obtaining check data from the provided paper check, the check data including data indicating the paper check funds;

the check conversion station providing at least part of the consumer account data and check data to one or more processors;

the one or more processors analyzing, and/or verifying, at least part of the consumer account data and check data;

accessing first historical transaction data of the consumer and second historical transaction data of the payer and analyzing the first and second historical transaction data to assess the reliability of the consumer and the payer;

approving, based on the analysis of the first and second historical transaction data for reliability of the consumer and the payer, a virtual transfer of less than the full amount of the paper check funds to the pre-paid debit or credit card, and updating the pre-paid debit or credit card balance stored on the pre-paid debit or credit card;

virtually transferring the approved amount of the paper check funds to the pre-paid debit or credit card;

offering at least one card-linked offer to the consumer, the offer being linked to the purchase of at least one specific item, the offer including an offer term indicating that a balance of the pre-paid debit or credit card will be increased by a certain predefined percentage upon purchase of the specific item by the consumer using the pre-paid debit or credit card; and tracking, using information stored on the pre-paid debit or credit card, any progress made by the consumer towards satisfaction of the card-linked offer.

2. The computing system implemented method for converting paper checks into pre-paid debit or credit card funds of claim 1, wherein;
the pre-paid debit or credit card is a pre-paid debit or credit card selected from the group of pre-paid debit or credit cards consisting of:
a physical credit or debit card;
a smart card;
a memory stick; and
a mobile computing system.

3. The computing system implemented method for converting paper checks into pre-paid debit or credit card funds of claim 1, wherein;
the check conversion station is located in a publically accessible area.

4. The computing system implemented method for converting paper checks into pre-paid debit or credit card funds of claim 1, wherein;
the check conversion station is included as part of an ATM machine.

5. The computing system implemented method for converting paper checks into pre-paid debit or credit card funds of claim 1, wherein;
the check conversion station card reader is selected from the group of card readers consisting of:
a card swiping system;
a smart card reader;
a memory reading or access station;
an infrared signal transmitter or receiver;
any electromagnetic wave transmitter or receiver; and
a scanner.

6. The computing system implemented method for converting paper checks into pre-paid debit or credit card funds of claim 1, wherein;
the check conversion station paper check scanner is an optical scanner.

7. The computing system implemented method for converting paper checks into pre-paid debit or credit card funds of claim 1, wherein;
at least part of the consumer account data is selected from the group of consumer account data consisting of:
the consumer's identification data; and
one or more security systems.

8. The computing system implemented method for converting paper checks into pre-paid debit or credit card funds of claim 1, wherein;
at least part of the check data is selected from the group of check data consisting of:
a digital image of the paper check;
the paper check funds;
the payee name;
the payer's name;
the account number associated with the paper check;
the bank associated with the paper check;
the ABA routing number associated with the paper check; and
the date of the paper check.

9. The computing system implemented method for converting paper checks into pre-paid debit or credit card funds of claim 1, wherein;
the one or more processors analyzing, and/or verifying, at least part of the consumer account data and check data are processors associated with the check conversion station.

10. The computing system implemented method for converting paper checks into pre-paid debit or credit card funds of claim 1, wherein;
the one or more processors analyzing, and/or verifying, at least part of the consumer account data and check data are processors associated with a computing system that is at a location remote from the check conversion station.

11. A check conversion station, the check conversion station comprising:
a card reader for obtaining consumer account data from a pre-paid debit or credit card associated with a pre-paid debit or credit card account, the pre-paid debit or credit card having an associated pre-paid debit or credit card balance stored on the pre-paid debit or credit card, the pre-paid debit or credit card balance representing funds that can be used via the pre-paid debit or credit card;

a paper check scanning capability for obtaining check data from a provided paper check, the paper check representing paper check funds transferred from a payer listed on the paper check to the consumer via the paper check, the check data including data indicating the paper check funds;

one or more means for accessing one or more processors, the processors analyzing, and/or verifying, at least part of the consumer account data and check data;

accessing first historical transaction data of the consumer and second historical transaction data of the payer and analyzing the first and second historical transaction data to assess the reliability of the consumer and the payer;

approving, based on the analysis of the first and second historical transaction data for reliability of the consumer and the payer, a virtual transfer of less than the full amount of the paper check funds to the pre-paid debit or credit card, and updating the pre-paid debit or credit card balance stored on the pre-paid debit or credit card;

virtually transferring the approved amount of the paper check funds to the pre-paid debit or credit card;

offering at least one card-linked offer to the consumer, the offer being linked to the purchase of at least one specific item, the offer including an offer term indicating that a balance of the pre-paid debit or credit card will be increased by a certain predefined percentage upon purchase of the specific item by the consumer using the pre-paid debit or credit card; and tracking, using information stored on the pre-paid debit or credit card, any progress made by the consumer towards satisfaction of the card-linked offer.

12. The check conversion station of claim 11, wherein;
the pre-paid debit or credit card is a pre-paid debit or credit card selected from the group of pre-paid debit or credit cards consisting of:
a physical credit or debit card;
a smart card;
a memory stick; and
a mobile computing system.

13. The check conversion station of claim 11, wherein;
the check conversion station is located in a publically accessible area.

14. The check conversion station of claim 11, wherein;
the check conversion station is included as part of an ATM machine.

15. The check conversion station of claim 11, wherein;
the check conversion station card reader is selected from the group of card readers consisting of:
a card swiping system;
a smart card reader;
a memory reading or access station;
an infrared signal transmitter or receiver;
any electromagnetic wave transmitter or receiver; and
a scanner.

16. The check conversion station of claim 11, wherein;
the check conversion station paper check scanner is an optical scanner.

17. The check conversion station of claim 11, wherein;
at least part of the consumer account data is selected from the group of consumer account data consisting of:
the consumer's identification data; and
one or more security systems.

18. The check conversion station of claim 11, wherein;
at least part of the check data is selected from the group of check data consisting of:
a digital image of the paper check;
the paper check funds;
the payee name;
the payer's name;
the account number associated with the paper check;
the bank associated with the paper check;
the ABA routing number associated with the paper check; and
the date of the paper check.

19. The check conversion station of claim 11, wherein;
the one or more processors analyzing, and/or verifying, at least part of the consumer account data and check data are processors associated with the check conversion station.

20. The check conversion station of claim 11, wherein;
the one or more processors analyzing, and/or verifying, at least part of the consumer account data and check data are processors associated with a computing system that is at a location remote from the check conversion station.

* * * * *